May 12, 1959  C. J. M. BENINK ET AL  2,885,983

SEWING MACHINES

Filed Dec. 24, 1956  4 Sheets-Sheet 3

INVENTORS
Christiaan Joseph Marinus BENINK
Erich WRASE

BY Robert H. Jacob
AGENT

May 12, 1959 C. J. M. BENINK ET AL 2,885,983
SEWING MACHINES

Filed Dec. 24, 1956 4 Sheets-Sheet 4

INVENTORS
Christiaan Joseph Marinus BENINK
Erich WRASE

BY Robert H. Jacob.
AGENT

United States Patent Office 2,885,983
Patented May 12, 1959

2,885,983

SEWING MACHINES

Christiaan Joseph Marinus Benink and Erich Wrase, Kaiserslautern, Pfalz, Germany, assignors to G. M. Pfaff A.-G., Kaiserslautern, Pfalz, Germany, a German joint-stock company Application December 24, 1956, Serial No. 630,240

Claims priority, application Germany December 22, 1955

3 Claims. (Cl. 112—211)

The present invention relates to feeders for sewing machines of the kind wherein a feed gear is arranged under the base plate or table of the machine in a pivotal frame, which is adjustable in height, and, for varying speed, is driven by a selector key controlled speed change gear.

With such a mechanism the number of feed speeds for the feed gear which the change speed gear makes available, is limited by the number of inter-engaging pairs of gears available. Since the space beneath the base of the sewing machine is sufficient for accommodating only a limited number of pairs of gears, it is impossible to increase the number of feed speeds as desired without dismantling the gears and substituting others. To change the feed speeds it is known to use a set of change gears instead of a connectable speed change gear, but in this known form of construction, the gears must be removed from the shafts and exchanged (for others) whenever it is desired to change the rotary speed of the feed gear. The number of feed speeds is then exclusively dependent on the number of pairs of change gears available.

Hitherto it has been sufficient to use one pair of change gears or a controllable speed change gear having a limited number of feed speeds. The simultaneous use of a set of change gears and a speed change gear encountered difficulties. These were partly due to lack of space and partly to the requirement that, on the one hand, the feed gear must be adjustable in height and, on the other hand, one speed change gear must be stationary, owing to the necessary driving key connection.

The present invention overcomes these difficulties by associating a set of change gears with the speed change gear, the gears of both systems being arranged on two shafts in such manner that the driving wheel of the set of change gears is located together with the driven wheels of the speed change gear on a bushing or sleeve receiving the feed gear shaft carrying the driven wheel of the set of change gears while the intermediate gears are carried by a bushing or sleeve on the driving shaft.

Thus for the first time, the present invention renders it possible to multiply the rotary speed changes of the feed gear by simple adjustments, avoiding the storing of sets of gears which are not for immediate use.

An embodiment of a feeding device constructed in accordance with the present invention and for use on sewing machines is illustrated in the accompanying drawings in which.

Figure 1:
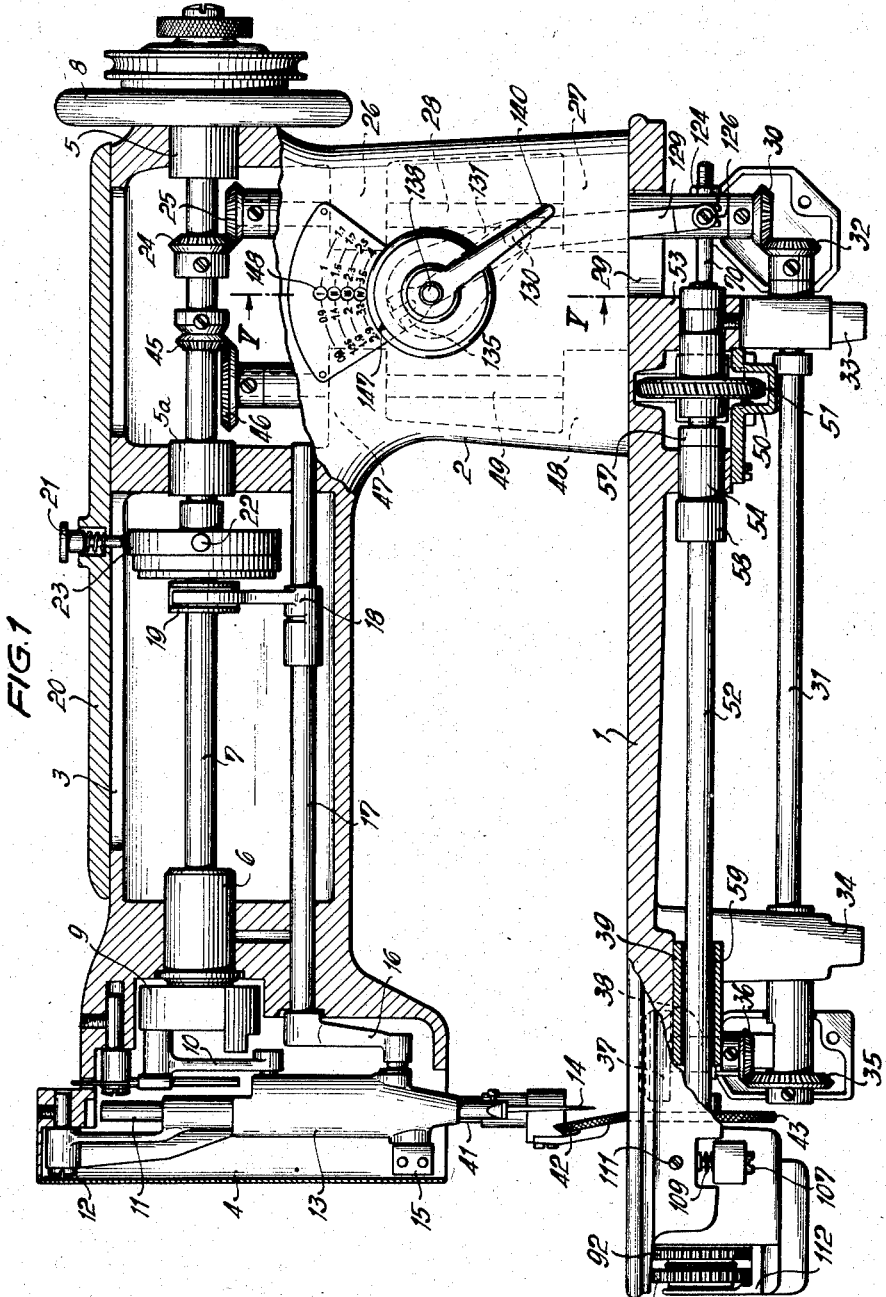
Figure 1 is a view from the front, partly in section, of a sewing machine incorporating the new feed device.

On a base plate 1 of the sewing machine is mounted a standard 2 from which a horizontal arm 3 extends, said arm terminating in a head 4. Within the arm 3 an arm shaft 7 is journalled in bearing bushings 5, 5a and 6. The shaft 7 carries at one end a balance wheel 8 and at the other end a crank 9, which is in driving connection with a needle bar 11 by means of a needle bar member 10. The needle bar 11 is mounted in an oscillator 13 pivoting about a pin 12, and carries at its lower end the needle 14. The needle bar oscillator 13 is guided by a slide member 15 mounted in the head 4.

The drive of the needle bar oscillator 13 is effected by a crank 16 which is mounted on the oscillating shaft 17 journalled in the arm 3. On the latter is located a bifurcated lever 18 which is in operative connection with a cam 19 adjustably arranged on the arm shaft 7. The adjustment of the eccentricity of the cam 19 is effected in known manner, after the engagement of a spring-loaded lock pin 21 in a retaining groove 22 of an adjusting member 23, by turning the arm shaft 7 by hand, said lock pin 21 being fitted in a cover 20 of the arm 3.

Figure 2:
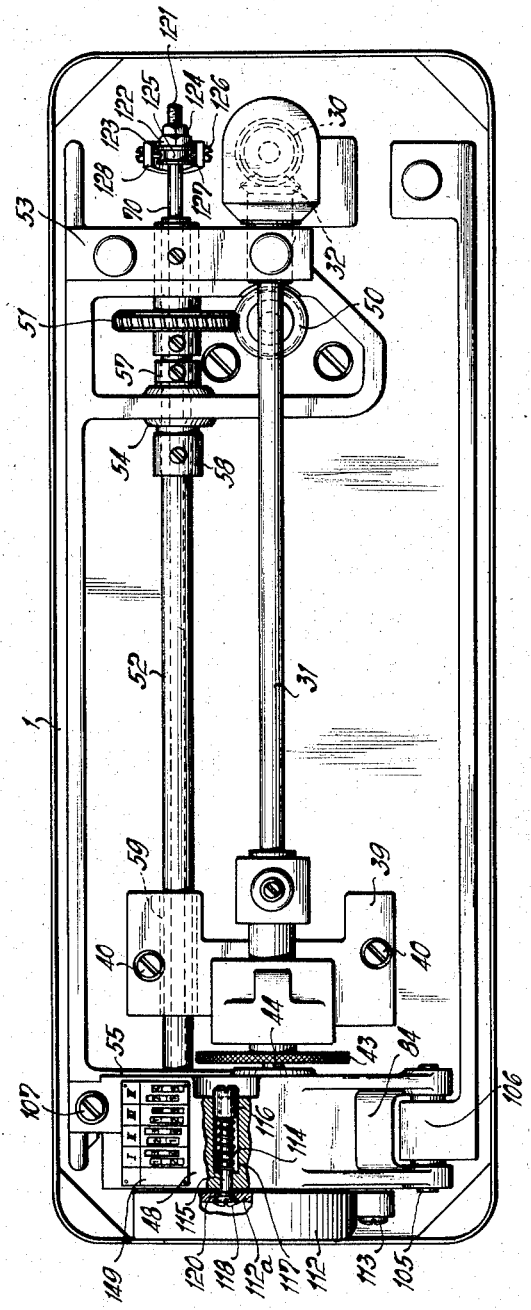
Figure 2 is a plan view of the machine, partly cut open.

The drive of the lower stitch-forming instruments is effected in known manner by the arm shaft 7. The latter is provided with a bevel gear 24 which engages with a bevel gear 25 mounted on the upper end of the vertical shaft 28 journalled in lugs 26 and 27 in the standard 2. The vertical shaft 28, extending through an opening 29 to below the base, carries at the end the bevel gear 30 which meshes with a bevel gear 32 fixed to a looper driving shaft 31. The shaft 31 is rotatably journalled in lugs 33 and 34 in the base 1 and is in driving connection through a pair of bevel gears 35 and 36 with a looper shaft 38 carrying the looper 37. The looper shaft 38 is journalled in the support 39 (Figure 2) which is screwed to the base 1 by screws 40.

In the head of the machine a spring-biased material presser bar 41 (Figure 1) is mounted in known manner, and carries, also in known manner, a roller foot 42 on its lower end. A feed wheel 43 arranged under the base 1 co-operates with said foot.

Figure 4:
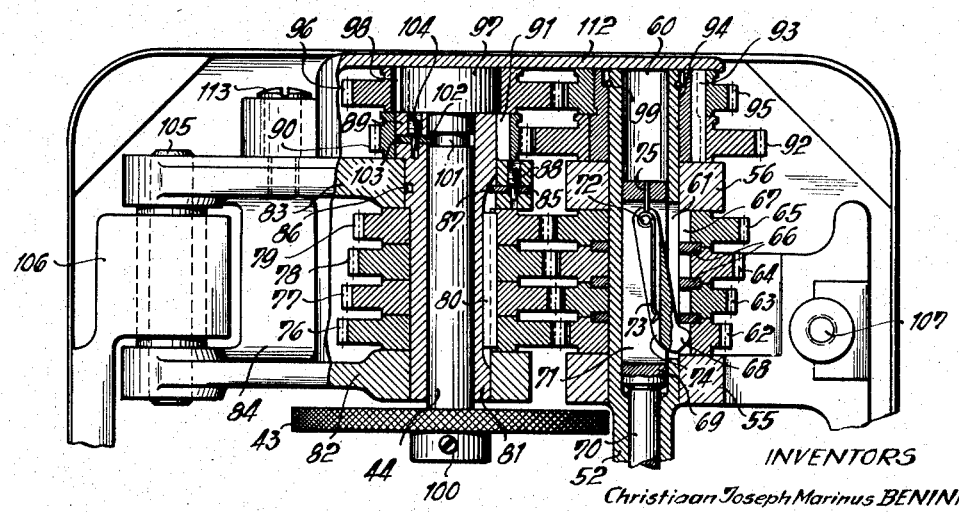
Figure 4 is a section taken on the line IV—IV of Figure 3.

The drive of the feed wheel 43 which is arranged on a shaft 44 is also effected from the arm shaft 7. For this purpose, a further bevel gear 45 is mounted on the arm shaft 7 and meshes with a bevel gear 46 located on the upper end of a vertical shaft 49 journalled in lugs 47 and 48 in the standard 2. The lower end of the vertical shaft 49 carries a worm 50 in engagement with a worm gear 51, which is screwed or otherwise secured to a hollow driving shaft 52 rotatable in bearings 53, 54, 55 and 56 (Figures 2 and 4) of the base 1. The driving shaft 52 is prevented from axial displacement by two set collars 57 and 58 which are mounted on opposite sides of a recessed bearing 54 of the driving shaft 52. The support 39 has a bore 59 of greater diameter than the shaft 52 in order to ensure free passage of the latter on the one hand, and to avoid limiting the adjustability of the looper 37, on the other hand.

The diameter of the hollow driving shaft 52 (Figure 4) is increased somewhat at that end adjacent the head 4 of the machine. In addition, the shaft is there provided with a rather large bore 60 and an axial slot 61. Between the bearings 55 and 56 of the base 1, four gears 62, 63, 64 and 65 of a speed change gear train are rotatably journalled to the shaft 52. The said gears are separated from one another by spacing rings 66 disposed on the shaft 52.

The gears 62–65 are each provided with three grooves 67 which are distributed uniformly over the periphery of the bores of the gears and in which a driving key 68 can engage as desired. The latter is rotatably mounted by means of a pin 72 in a slot 71 on a cylinder member 69 axially displaceable in the bore 60 of the driving shaft 52 and associated with a switch bar 70 passing through the hollow driving shaft.

The driving key 68 is biassed by a spring 73 which presses it through the slot 61 of the shaft 52 into one of the grooves 67 of a selected gear in order to couple the shaft 52 with this gear. The spring 73 is wound round the pin 72 and at one end is located in a slot 74 of the driving key 68. At its other end the spring is inserted in a bore 75 of the cylinder member 69 of the switch bar 70.

The gears 62, 63, 64 and 65 are in engagement with gears 76, 77, 78 and 79 which are secured by means of a key 80, which is common to them all, to a bearing bushing 81 or sleeve. The latter is journalled in two side members 82 and 83 of a pivotable frame 84, and is prevented from axial displacement by a disc 85 projecting into an annular groove 86 in the bearing bushing 81. The disc 85 is located in a slot 87 in the side 83 and is held therein by means of a screw 88.

The end 89 of the bearing bushing 81 remote from the feed wheel 43 is thickened and carries a gear 90, the first of a set of change gears. This gear 90 is connected by a key 91 to the bearing bushing 81, and engages with the second gear 92 of the set of change gears which is removably mounted, by means of a key 93, on a bushing 94 which in turn is journalled on the hollow driving shaft 52. To the bushing 94 is connected a third gear wheel 95 of the set of change gears also by means of the key 93. The gear wheel 95 is engaged by a fourth or last gear wheel 96 of the set of change gears which is secured by means of a key 98 on a collar 97 of the feed gear shaft 44. For purposes of interchangeability, the bores of the pairs of gear wheels 90 and 92 or 95 and 96 of the change gear set are identical. This makes it possible to obtain four different transmissions of the set of change gears which, together with the speed change gear train, render possible sixteen different rotary speeds for the shaft 44 of the feed wheel. The bushing 94 is secured against axial displacement to the shaft 52 by a spring ring 99.

The shaft 44 of the feed wheel is rotatably housed in the bearing bushing 81 and carries the feed wheel 43 which is secured on the shaft by means of a screw 100. The shaft 44 is provided with an annular groove 101 into which projects a disc 102 which is received in a slot 103 of the bearing bushing 81 and retained by a screw 104. This secures the shaft 44 against axial displacement.

Figure 3:
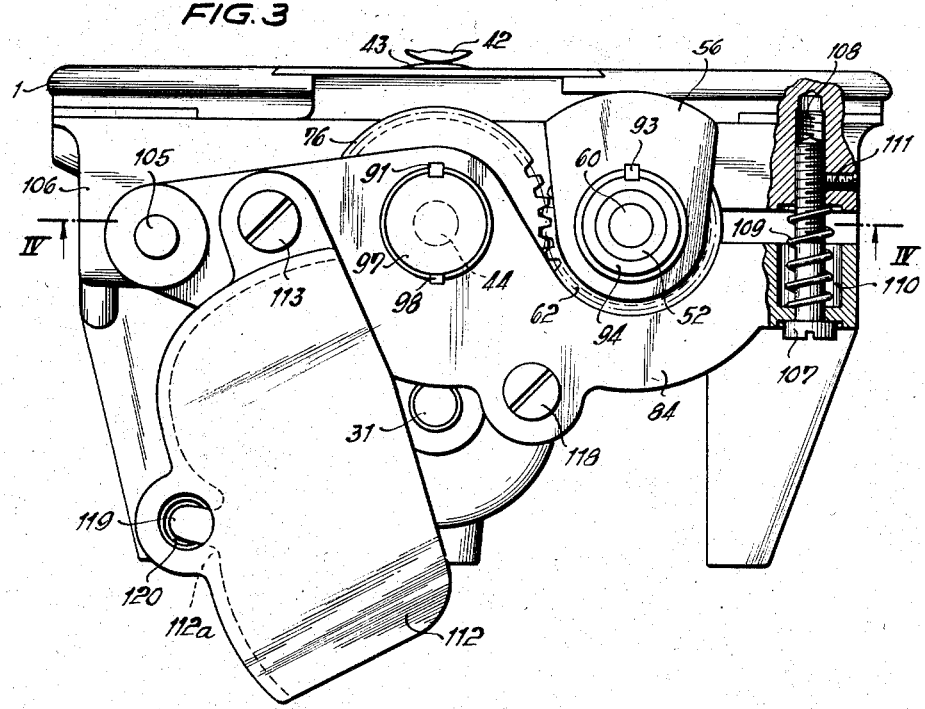
Figure 3 is an enlarged end view of the lower part of the driving mechanism of the machine with the cover swung out, and the change gears removed.

The pivotal frame 84 is journalled by means of a bolt 105 (Figures 2 and 3) to swing in a lug 106 of the base 1. Its free end is secured to the base 1 by means of a set screw 107 which engages in a threaded bore 108. Around the set screw 107 is disposed a pressure spring 109 which at one end is in contact with the base 1 and at the other end rests in a recess 110 of the frame 84. By turning the screw 107 the feed wheel shaft 44, mounted in the pivotal frame 84, can be adjusted in height as can also the feed wheel 43. The screw 107 is maintained in its position of adjustment by a traverse or locating screw 111.

The set of change gears is protected by a cover 112 which is rotatably mounted on the pivotal frame 84 by means of a collar screw 113 and retained by a clamping device. The latter consists of a screw 115 biased by a spring 114 (Figure 2) and axially displaceable in the pivotal frame 84 on which is screwed a pressure member 116 which is guided in a bore 117 of the pivotable frame 84. The head 118 of the screw 115 is able to engage in a depression 120 which is provided at the end of an arcuate recess 119 (Figure 3) and appertaining to a lug 112a constructed on the cover 112 and is in this way able to retain the cover 112. The arcuate recess 119 extends concentrically to the axis of rotation 113 of the cover 112 and is of the width of the screw shaft.

When pressure is exerted on the pressure member 116, the screw head 118 is raised from the depression 120 and the cover can be swung away. The gears of the set of change gears are then accessible.

Figure 5:
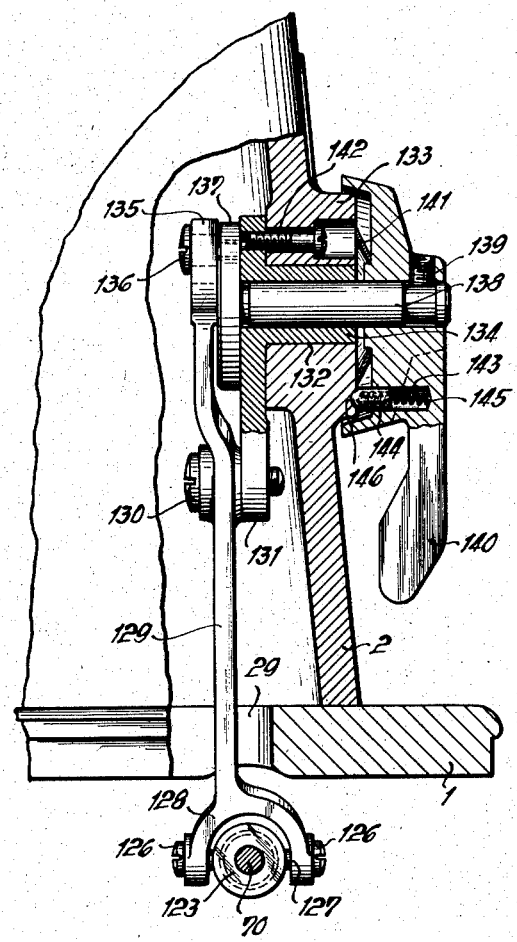
Figure 5 is a part elevation, on an enlarged scale, of the machine on a section taken on the line V—V of Figure 1.

The switch rod 70 which is displaceable in the hollow driving shaft 52 (Figure 2) is provided, at the end facing the standard 2 of the machine, with a thread 121 on which a disc 123 having a hexagon 122 is screwed and is secured by a lock nut 124. The disc 123 has an annular groove 125 into which project two pins 127 which are constructed relatively opposed on screws 126 and are screwed into the bifurcated end 128 of a transmission lever 129 (Figure 5). The latter extends through the opening 29 of the base 1 into the hollow standard 2 and is rotatably journalled on the lug 131 of the bearing bushing 134 received in the bore 132 of a lug 133 in the standard 2. The other end 135 of the transmission lever 129 is also bifurcated. The fork 135 engages a collar screw 136 screwed into a disc 137 which is mounted on one end of a control shaft 138 rotatably journalled in the bearing bushing 134. On the other end of the control shaft 138, projecting out of the standard 2, a switch lever 140 is mounted by means of a grub screw 139. Between the lever 140 and the boss 133 is inserted a plate spring 141. The bearing bushing 134 is prevented from twisting by a screw 142.

The switch lever 140 has, on the side facing the standard 2, a bore 143 which receives, axially displaceable, a pressure member 144 biassed by a spring 145 which presses the pressure member 144 against the boss 133 of the standard 2. To fix the individual switch positions of the switch lever 140 the pressure member 144 can engage in cap-shaped depressions 146 of the boss 133. The switch lever 140 is also provided with a score mark 147 (Figure 1) which co-operates with a scale 148 on the standard 2 for adjusting the desired stitch length or the speed of the feed gear 43 respectively. The Roman numerals on the scale 148 correspond to the individual stitch groups which result from reversing the change gears. With each stitch group are associated four feed speeds adjustable by the speed change gear train; they are indicated on the scale 148 by Arabic numerals.

A diagram 149 on the pivotable frame 84 (Figure 2) indicates the position of the individual gears of the set of change gears for the individual groups of stitches.

The adjustment of the desired stitch length is effected in the following manner.

The stitch group containing the desired stitch length can immediately read on the scale 148 on the standard 2. The position of the change gears of the corresponding stitch group can be obtained from the diagram 149 on the oscillating frame 84 after raising the machine.

By applying pressure on the pressure member 116 the cover 112 can be easily turned back and then access is obtained to the speed change gear. The individual gears of the speed change gear are now reversed with reference to the diagram 149. If the individual gears are in the correct sequence, the cover 112 is raised and the machine swung back. The switch lever 140 is now adjusted to the stitch length indicated on the scale 148. Thus, the driving key 68 is engaged with the appropriate toothed wheel of the speed change gear train by means of the transmission level 129 and the switch rod 70.

If, for example, the driving key 68 is coupled to the gear wheel 62 (Figure 2) the power train is as follows: driving shaft 52, gear wheels 62 and 76 of the speed change gear, gear wheels 90, 92, 95 and 96 of the set of change gears, speed gear shaft 44 and feed wheel 43.

The adjustment of the oscillating range of the needle 14 corresponding to the advance of the feed wheel 43 is effected in the above described manner by means of the adjusting cam 19.

The advance of the feed wheel 43 may be varied, within limits which are sufficient in practice, within the stitch groups by the switch lever 140, without reversing the machine.

It will be appreciated that variations or modifications of the constructions illustrated in the drawings may be utilised without departing from the spirit and scope of the invention as defined in the appended claims. Thus the specification and drawings should be considered in an illustrative rather than in a limiting sense.

We claim:

1. A feeding mechanism for a sewing machine having a base, a feed wheel mounted on a feed wheel shaft and a drive shaft mounted in said base; said mechanism including a pivotally mounted frame hinged to said base and provided with means for adjusting the height of said frame and said feed wheel relative to said base and carrying said feed wheel and shaft, a speed change gear train including a plurality of driving gears mounted on said drive shaft, a key mounted on said drive shaft, said key being adjustable by manipulating means mounted externally of said machine to select and engage one of said driving gears, and a plurality of driven gears mounted concentric with said feed wheel shaft and meshing with said driving gears; said mechanism further including a set of change gears comprising a first gear, a sleeve surrounding said feed wheel shaft carrying said first gear and said driven gears and a last gear secured to said feed wheel shaft and rotatable therewith, a bushing on said drive shaft and intermediate gears carried by said bushing and rotatable relative to said drive shaft.

2. A feeding mechanism for a sewing machine having a base, a feed wheel mounted on a feed wheel shaft and a drive shaft mounted in said base; said mechanism including a pivotally mounted frame hinged to said base and provided with means for adjusting the height of said frame and said feed wheel relative to said base and carrying said feed wheel and shaft, a speed change gear train including a plurality of driving gears mounted on said drive shaft, a key mounted on said drive shaft, said key being adjustable by manipulating means mounted externally of said machine to select and engage one of said driving gears, and a plurality of driven gears mounted concentric with said feed wheel shaft and meshing with said driving gears; said mechanism further including a set of change gears comprising a first gear, a sleeve surrounding said feed wheel shaft carrying said first gear and said driven gears and a last gear secured to said feed wheel shaft and rotatable therewith, a bushing on said drive shaft and intermediate gears carried by said bushing and rotatable relative to said drive shaft, said drive shaft having a slotted hollow portion receiving said key and a hollow portion receiving a rod disposed in said drive shaft for moving said key and said manipulating means including a manual member linked to said rod for moving said key.

3. A feeding mechanism for a sewing machine having a base, a feed wheel mounted on a feed wheel shaft and a drive shaft mounted in said base; said mechanism including a pivotally mounted frame hinged to said base and provided with means for adjusting the height of said frame and said feed wheel relative to said base and carrying said feed wheel and shaft, a speed change gear train including a plurality of driving gears mounted on said drive shaft, a key mounted on said drive shaft, said key being adjustable by manipulating means mounted externally of said machine to select and engage one of said driving gears, and a plurality of driven gears mounted concentric with said feed wheel shaft and meshing with said driving gears; said mechanism further including a set of change gears comprising a first gear, a sleeve surrounding said feed wheel shaft carrying said first gear and said driven gears and a last gear secured to said feed wheel shaft and rotatable therewith, a bushing on said drive shaft and intermediate gears carried by said bushing and rotatable relative to said drive shaft, said set of change gears being interchangeable and said speed change gear train being selectable by said key to provide various combinations of gears permitting a continuous series of speeds for said feed wheel.

References Cited in the file of this patent

UNITED STATES PATENTS

| 824,914 | Drake | July 3, 1906 |
| 2,193,754 | Andres | Mar. 12, 1940 |
| 2,254,779 | Meyers | Sept. 2, 1941 |
| 2,470,502 | Le Vesconte et al. | May 17, 1949 |

FOREIGN PATENTS

| 719,988 | Germany | Apr. 22, 1942 |